United States Patent [19]

Bonitz et al.

[11] Patent Number: 4,462,362
[45] Date of Patent: Jul. 31, 1984

[54] ENGINE KNOCK CONTROL SUPERVISORY SYSTEM

[75] Inventors: Jörg Bonitz, Mühlacker; Robert Entenmann, Benningen; Rochus Knab, Kornwestheim; Siegfried Rohde, Schwieberdingen; Herbert Schramm, Stuttgart, all of Fed. Rep. of Germany

[73] Assignee: Robert Bosch GmbH, Stuttgart, Fed. Rep. of Germany

[21] Appl. No.: 393,421

[22] Filed: Jun. 29, 1982

[30] Foreign Application Priority Data

Jul. 18, 1981 [DE] Fed. Rep. of Germany ....... 3128475

[51] Int. Cl.³ .............................................. F02B 5/14
[52] U.S. Cl. .................................... 123/425; 123/435; 73/35
[58] Field of Search ................... 123/425, 435; 73/35

[56] References Cited

U.S. PATENT DOCUMENTS

| 4,002,155 | 1/1977 | Harned et al. | |
| 4,133,475 | 1/1979 | Harned et al. | |
| 4,290,398 | 9/1981 | Hattori et al. | 123/425 |
| 4,300,503 | 11/1981 | Deleris et al. | 123/425 |
| 4,345,558 | 8/1982 | Yamaguchi et al. | 123/425 |
| 4,346,586 | 8/1982 | Furrey | 73/35 |
| 4,378,771 | 4/1983 | Sawada et al. | 123/425 |

FOREIGN PATENT DOCUMENTS 2918420 11/1980 Fed. Rep. of Germany .
3009046 9/1981 Fed. Rep. of Germany .
3010324 10/1981 Fed. Rep. of Germany .

OTHER PUBLICATIONS

*Automobiltechnisches Handbuch,* ed. Bussien, Berlin, 1965, pp. 52-55, 972-975, 984-1003.

Primary Examiner—Parshotam S. Lall
Attorney, Agent, or Firm—Frishauf, Holtz, Goodman & Woodward

[57] ABSTRACT

A knocking sensor provides output signals which are compared in a comparator (14) with a reference (16), knocking signals (FIG. 3: U17) exceeding the reference (U16); during predetermined cyclically recurring test intervals (FIG. 2: 19), for example after each 1000 ignition events, a test signal is generated at a terminal (15) of a microprocessor (12) and applied to the comparator (14) to lower the reference level (16), so that noise signals will cause a simulated, or pseudo knocking signal to be generated. Simultaneous occurrence of the simulated, or pseudo knocking signal and test signals indicates appropriate function of the knocking system; failure of the pseudo knocking signal to occur with the lowered reference generates control output from the microprocessor, for example by retarding ignition of an ignition system (13).

13 Claims, 3 Drawing Figures

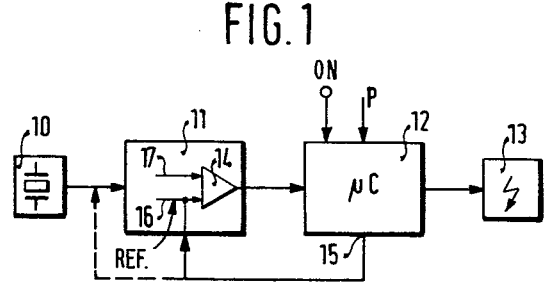
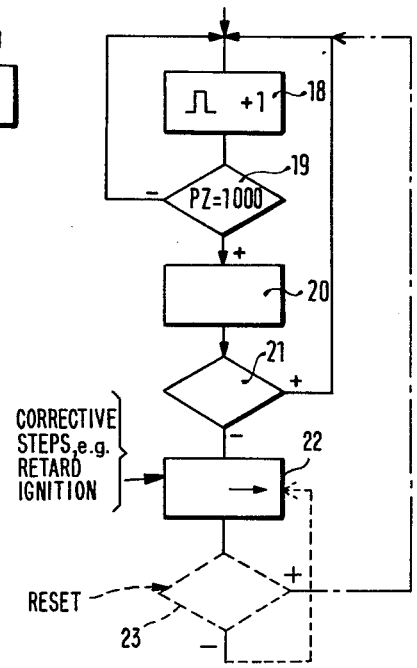
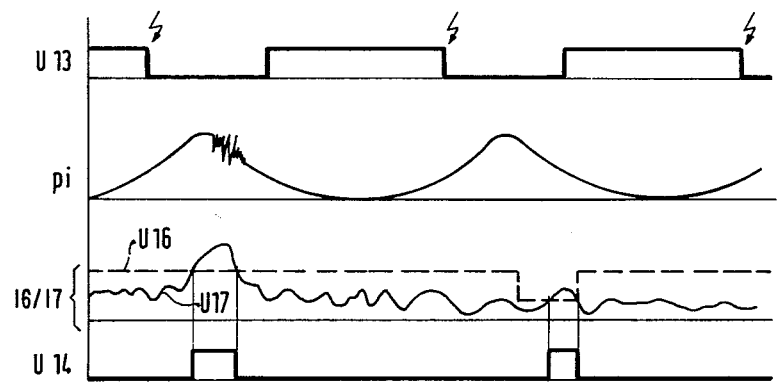

ENGINE KNOCK CONTROL SUPERVISORY SYSTEM

The present invention relates to a supervisory or monitoring system to supervise the proper functioning and operation of an internal combustion engine control system which includes an engine knocking sensing system, and is so arranged that the internal combustion (IC) engine operates essentially close to the knocking limit thereof.

BACKGROUND

Various types of knocking control systems for use with internal combustion engines are known and described in the literature, see, for example, German Patent Disclosure Documents DE-OS Nos. 26 59 239 (corresponding to U.S. Pat. No. 4,002,155); 28 01 512 (corresponding to U.S. Pat. No. 4,133,475); 30 09 046. They may cooperate with evaluation circuitry described, for example, in German Patent Disclosure Documents Nos. 29 18 420 and 30 10 324.

Engine knocking can be controlled in various ways, see, for example, "Automotive Handbook" issued by the assignee of the present application, Robert Bosch GmbH, first English edition 1976, chapter on knocking or pinging, page 246 et seq.

Knocking control systems are so arranged that they shift engine operating control parameters, for example ignition timing, with respect to a predetermined engine operation in such a direction that the engine operates just below the knocking limit thereof. This operation contributes to efficiency and decreased fuel consumption. Such systems, however, may include the danger that failure of a component therein, and particularly a component within the knocking evaluation or recognition system could shift the operating parameters of the engine towards knocking range, which may endanger the engine and lead to damage or possibly even failure thereof.

THE INVENTION

It is an object to provide a monitoring or supervisory system in which failure of components within the knocking recognition and control system can be detected and provide an output signal which can be used to shift the operating parameters of the engine reliably and safely into a non-knocking range to permit continued operation of the engine, even though such continued operation may be at a lower level of efficiency.

Briefly, a cyclically recurring test signal is generated which monitors occurrence of either knocking signals or background noise signals therein. If, during the test interval, no signals are detected in the evaluation circuit, the operating parameters of the engine are shifted in dependence on the output from the evaluation circuit in a direction in which knocking is reliably prevented, for example by delaying ignition timing, by shifting the spark towards retardation, by enriching the fuel-air mixture, or the like.

The monitoring system has the advantage that the entire knocking control portion of the engine control system is cyclically tested; if malfunction is recognized, the knocking control portion is disconnected or its control is inhibited, and the working characteristics of the IC engine are shifted into a range in which knocking is reliably prevented. This shift permits continued operation of the engine, without danger of damage thereto. Further, an indication to the vehicle operator may be given, for example by a warning light, that a defect should be corrected; yet, until its correction, the engine remains operative without danger of damage thereto.

DRAWINGS

FIG. 1 is a schematic block diagram of an example of the circuit in accordance with the invention;

FIG. 2 is a flow diagram illustrating the operating sequence of the system; and

FIG. 3 is a signal diagram showing signals which arise in the system of FIG. 1.

A knocking sensor 10, which may be of any known construction, is connected to an evaluation circuit 11. The evaluation circuit 11 provides output signals to a microprocessor or microcomputer 12. The microcomputer 12 receives input signals which are collectively schematically illustrated by the arrow P, and which depend on parameters of engine operation. The output from the microcomputer 12 is connected to an ignition control system 13 which controls the timing or occurrence of the ignition spark applied to the spark plugs with respect to the angular position of the crankshaft of the engine, and hence the position of the piston within a cylinder of the IC engine with respect to the top dead-center (TDC) positions thereof.

The system is illustrated in connection with a modern form of automotive-type on-board vehicle computer, including a microcomputer 12 which controls ignition timing in dependence on operating parameters of the engine, such as speed, loading, exhaust gas composition, and the like. Rather than using a microcomputer 12, a direct or discrete circuit may be used, for example as described in the aforementioned references. The unit 12 thus can be so programmed or constructed that it provides output signals to the ignition system 13 to control the ignition timing thereof.

Rather than using an ignition control system 13 which influences the operating point or operating conditions of the engine, other parameters may be used in order to change the operating point thereof from, for example, knocking or pinging operation to normal combustion operation. For example, the output from the unit 12 can be used to enrich the fuel-air mixture, to provide additives to increase resistance to knocking, such as additives of water, alcohols, anniline, temporary addition of ethyl lead—where permitted—and the like, as well as combinations of the foregoing. Additionally, the EGR (Exhaust Gas Recirculation) valve or line can be influenced, the temperature of operation of the engine, and specifically the induction air temperature, or the temperature of the fuel-air mixture can be changed; likewise, cooling of the motor can be altered, timing of fuel injection, if the engine is fuel injection controlled, changing of turbo charge pressure if a turbo charger is connected thereto, or other changes in the operation of the engine and its parameters may be made. Reference is made particularly to the literature "Automobiltechnisches Handbuch" referred to above.

The evaluation circuit 11, preferably, is constructed as known and described for example in the technical literature, see, German Patent Disclosure Documents DE-OS Nos. 29 18 420 and 30 10 324, and U.S. Ser. No. 389,586, filed June 18, 1982, entitled "INTERNAL COMBUSTION ENGINE KNOCK SENSING SYSTEM", SELLMAIER et al., assigned to the assignee of the present application, the disclosures of the latter being hereby incorporated by reference. The evaluation circuit includes a comparator 14 which compares the signals picked up by the sensor 10 with a reference. The reference signals, as described in published technology, is obtained, for example, by averaging knocking sensor signals over an extended period of time. Other evaluations may be used—see the aforementioned SELL-MAIER et al. application.

The microprocessor 12 has an output 15 on which internally generated control signals are applied. The output 15 is connected to an input 16 of the comparator 14. Input 16 has the reference signals applied thereto, input 17 the signals derived from the sensor 10, for example after amplification, filtering, or other signal processing.

Operation, with reference to FIGS. 2 and 3: The current flow, with respect to time, in the primary of an ignition coil forming part of the ignition system 13 is shown in the signal U13, FIG. 3. At the termination of current flow, an ignition event, symbolized by a lightning arrow, will occur. Ordinarily, upon current flow through the primary, an electromagnetic field will build up which, upon sudden interruption of current flow, induces a high-voltage pulse in the secondary, causing arc-over at the spark plug. The pressure variations within the cylinder are indicated in the second graph of FIG. 3 at pi. The input signals to the comparator 14 are shown at 16/17, line 3, and include the actual signal U17 derived from the sensor and the reference level signal U16.

If knocking occurs—which is shown in the first cycle of engine pressure variations—signal U17 will rise above the reference level signal U16. The reference signal will have a long time constant and cannot follow the rapid rise of signal U17. The comparator 14 will provide an output knocking signal U14.

The second cycle of ignition illustrates the case in which no knocking occurs. Cyclically, for example as controlled by a timing circuit or counting circuit within microprocessor 12, the control signal from terminal 15 thereof is connected to the reference terminal 16 which drops the level of the reference signal U16 for a predetermined period of time, defining a test interval. During this test interval, that is, the time during which the reference signal U16 is dropped, the waviness due to background noise signals derived from the sensor 10 will exceed the now dropped reference level and a pseudo knocking signal will be generated at the output of the comparator 14. Since this pseudo knocking signal occurs simultaneously with the test signal, it will be recognized by the microprocessor 12 as a simulated or pseudo knocking signal, and as confirmation that the sensor, the connecting lines thereto, the evaluation circuit 11, and other components therein, operate properly. Thus, recognition of a pseudo knocking signal during occurrence of the test signal—see second cycle in FIG. 3—is recognition of proper operation. Failure of an output signal U14 during the test interval is an indication of malfunction.

The control signal at terminal 15 is preferably generated by microprocessor 12 in recurring rhythm. Each ignition event, causing an ignition control pulse to be applied to ignition system 13, is counted. Each ignition cycle increments a register or counter by a value of 1. The counting of the ignition steps is illustrated in FIG. 2 in block 18. Incrementing the counter by a step of 1, and interrogating the counter in the subsequent interrogation step if the count value of 1000 has been reached, will provide generation of a test signal at terminal 15 when the count of 1000 has been reached—see the flow diagram of FIG. 2, steps 19 and 20. Step 21 then is used to test if, at the same time, a knocking signal is present; actually, this will be a pseudo knocking signal, due to noise in the knock sensing system since the reference level of comparator 14 had been lowered. If this is the case, the test is positive and a new cycle is started. If the test, however, is negative, then the evaluation circuit and suitable connecting lines, symbolically shown at 22, will have an indication that an error is present and that ignition is to be retarded, for example, or other corrective steps are to be taken. The microprocessor 12 will thereupon so change ignition timing that the operating point of the engine will no longer be within a range in which knocking is at all possible. In actual practice, and in the easist way of control, the ignition advance angle is changed or retarded for later occurrence than previously, with respect to TDC position of the piston. Alternatively, or additionally, one or more of the above referred to other operating interventions to prevent knocking or pinging may be commanded.

Retardation of the spark, or other corrective steps, may, in accordance with the invention, be retained only for a predetermined period of time; the operative condition of the circuit is then again tested. The newly set operating point may, however, in accordance with another feature of the invention, be maintained until the IC engine is started again, that is, until a new ignition-ON switching signal is sensed, for example by differentiating a turn-ON signal connected to the terminal ON of the microcomputer 12 upon operating the ignition or main switch of the vehicle. The reset interrogation step 23, since it is not strictly necessary, is indicated in broken lines in FIG. 2. A test for resetting can be carried out at step 23; if negative, the corrective step is again initiated; if positive, however, the normal counting cycles are again controlled, as shown by the chain-dotted lines from step 23.

The background noise caused by operation of the engine in the knock sensor is used as the signal generating oscillation. The system, thus, will test not only the sensor, but additionally its connection on or with or in the IC engine, all the connecting lines between the sensor and the evaluation circuitry and the evaluation system itself.

The test signal at the output 15 of the microprocessor 12 can be connected differently; rather than dropping the reference level at the comparator 14, it may be applied directly as a simulated knocking signal to the input of the evaluation circuit 11, for example by raising the level thereof. Other connecting points for the test signal can be selected in dependence on the extent of supervision desired; the system shown in full lines provides for most effective overall monitoring of operability of the knocking sensing system; other connection points may, however, be more easily accessible and, in some installations, it may only be necessary to supervise a portion of the overall system. For example, the presence of a certain testing range or signal response range or window within the evaluation circuit can be supervised.

It is of course possible to so control the microcomputer 12 that a number of recognition steps 22 have to be counted, for example by the reset step 23, before four consecutive knocking signals occurring during the test intervals as determined by step 20 and provide an ignition retardation step only if four consecutive knocking events have been determined. The number should be large enough to exclude the possibility that the engine runs so smoothly that no noise signals will occur during sequential test intervals, but not so large that the number of knocking events might damage the engine.

Various changes and modifications may be made within the scope of the inventive concept.

We claim:

1. Engine knock control supervisory system for an internal combustion engine having a knocking sensor (10) providing a knocking signal upon sensing engine knocking, and background noise signals;

an evaluation circuit (11) connected to and controlled by the sensor (10) and providing output signals representative of engine knocking;

an engine control unit (12, 13) controlling engine operation;

and comprising, in accordance with the invention, means (12, 18) for generating, from time to time, test signals;

means (15) connected to and controlling the signals derived from the sensor during occurrence of the test signals, to change their relative characteristics so that the signals then will be in the form of simulated knocking signals;

and means (22) for acting on said engine control unit (12, 13) and controlling said engine control unit to change the operating conditions of the engine in a direction in which knocking is prevented upon determination of failure of detection of knocking in the evaluation circuit (11) in response to said simulated knocking signals during occurrence of the test signals.

2. System according to claim 1, wherein the evaluation circuit (11) includes a comparator comparing the signals derived from the knocking sensor (10) with a reference (16);

wherein the means for generating test signals are connected to the comparator; and the signal control means change the reference level of the comparator to a lower level to evaluate background noise signals as the simulated knocking signals during occurrence of said test signals.

3. System according to claim 1, wherein said cyclically recurring test signals are generated by counting means (18, 19) connected to and controlled by ignition events under control of the engine control unit (12, 13) and providing said cyclically recurring test signals for predetermined numbers of ignition events.

4. System according to claim 3, wherein the predetermined number of ignition events is 1000 ignition events.

5. System according to claim 3, wherein the evaluation circuit (11) includes a comparator comparing the signals derived from the knocking sensor (10) with the reference (16);

wherein the means for generating test signals are connected to the comparator; and the signal control means change the relationship of reference level and the sensor signals to evaluate background noise signals as the simulated knocking signals during occurrence of said test signals.

6. System according to claim 1, further including reset means (23) resetting the operating conditions of the engine to the state prior to change thereof after a predetermined time interval.

7. System according to claim 1, further including means (ON) providing a "main switch ON" signal upon energization of the engine control unit (12), said ON signal resetting the engine control unit to control said engine control unit to establish engine operating conditions before change thereof in the direction in which knocking is inhibited.

8. System according to claim 1, wherein the evaluation circuit (11) includes a comparator comparing the signals derived from the knocking sensor (10) with a reference (16);

wherein the means for generating test signals are connected to the comparator; and the signal control means change the relationship of reference level and the sensor signals to evaluate background noise signals as the simulated knocking signals during occurrence of said test signals.

9. Method of monitoring an engine knock control system for an internal combustion engine, in which the engine knock control system has a sensor (10) providing a knocking signal upon sensing engine knocking and background noise signals;

an evaluation circuit (11) connected to and controlled by the sensor (10) and providing output signals representative of engine knocking;

and an engine control unit (12, 13) controlling engine operation, comprising, in accordance with the invention, the steps of generating, from time to time, test signals;

applying said test signals to the signals derived from the sensor;

changing the characteristics of the signals from the sensor, during occurrence of the test signals, to simulate knocking signals, so that the sensor signals then will be in the form of simulated knocking signals;

evaluating the sensor signals during occurrence of the test signals to determine:

(a) presence of sensor signals, or (b) absence of sensor signals, and controlling engine operation by controlling said engine control unit to an operating state in which knocking is positively prevented if said evaluation step indicates absence of sensor signals during occurrence of the test signals.

10. Method according to claim 9, wherein said changing and evaluation steps are combined and comprise changing the response relationship of a comparator (14) comparing the signals from the sensor (10) with respect to a reference during occurrence of the test signals in a direction in which the background noise signals derived from the sensor during occurrence of said test signals will simulate the knocking signals.

11. Method according to claim 9, including the step of comparing the signal derived from the sensor with a reference, and providing an output if the signal from the sensor exceeds the reference, thereby indicating presence of a knocking signal;

and said changing and evaluation steps are combined and comprise lowering the reference value during occurrence of said test signal to a level in which the background noise signals will exceed the reference level, thereby generating, during occurrence of the test signals, the simulated knocking signal.

12. Method according to claim 9, including the step of counting occurrence of ignition events of the internal combustion engine up to a predetermined number;

and generating said test signal when said number has been counted, so that tests relating to operability of the knocking control system will be carried out, cyclically, each time after occurrence of said number of ignition events.

13. Method according to claim 12, wherein said number is 1000 ignition events.

* * * * *

UNITED STATES PATENT AND TRADEMARK OFFICE
CERTIFICATE OF CORRECTION

PATENT NO. : 4,462,362
DATED : JULY 31, 1984
INVENTOR(S) : Jorg BONITZ et al

It is certified that error appears in the above-identified patent and that said Letters Patent is hereby corrected as shown below:

Please change claim 3 to read: -- System according to claim 1 wherein said test signals are generated by counting means (18, 19) connected to and controlled by ignition events under control of the engine control unit (12, 13) and providing said test signals for predetermined numbers of ignition events. --

Signed and Sealed this

Sixth Day of August 1985

[SEAL]

*Attest:*

DONALD J. QUIGG

*Attesting Officer*     *Acting Commissioner of Patents and Trademarks*